(12) United States Patent
Plantinga et al.

(10) Patent No.: US 11,573,980 B2
(45) Date of Patent: Feb. 7, 2023

(54) SECURE AUTHENTICATION FOR DISTRIBUTION OF AIRCRAFT FLIGHT DATA

(71) Applicant: GE Aviation Systems LLC, Grand Rapids, MI (US)

(72) Inventors: Jeffrey M. Plantinga, Grand Rapids, MI (US); Joachim K. Hochwarth, Caledonia, MI (US); Benjamin I. Coutts, Rockford, MI (US); Ralph D. Boozer, Rockford, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 86 days.

(21) Appl. No.: 17/134,125

(22) Filed: Dec. 24, 2020

(65) Prior Publication Data

US 2022/0207055 A1    Jun. 30, 2022

(51) Int. Cl.
  *G06F 16/27* (2019.01)
  *G06F 16/23* (2019.01)
  *G06F 21/62* (2013.01)

(52) U.S. Cl.
  CPC ........ *G06F 16/273* (2019.01); *G06F 16/2343* (2019.01); *G06F 21/6218* (2013.01)

(58) Field of Classification Search
  CPC ............... G06F 16/273; G06F 16/2343; G06F 21/6218; G06F 16/2358; G06F 16/2379; G06F 16/29; G08G 5/0013; G08G 5/0052; H04L 63/101; H04L 63/08; H04L 63/083; H04L 63/0861; H04L 67/12; G06Q 20/14; G06Q 30/0283; G06Q 50/30
  See application file for complete search history.

(56) References Cited

U.S. PATENT DOCUMENTS

| 6,272,338 | B1 | 8/2001 | Modzelesky |
| 6,353,794 | B1 | 3/2002 | Blachowicz |
| 7,158,880 | B2 | 1/2007 | Geiger |
| 9,734,723 | B1* | 8/2017 | Bruno ................. G08G 5/0052 |
| 2002/0083003 | A1 | 6/2002 | Halliday |
| 2009/0024312 | A1 | 1/2009 | Brinkman |

(Continued)

FOREIGN PATENT DOCUMENTS

| WO | 2004/010261 A2 | 1/2004 |
| WO | 2018/234858 A1 | 12/2018 |

OTHER PUBLICATIONS

Extended European Search Report for EP Application No. 21209347.0 dated May 6, 2022, 6 pages.

*Primary Examiner* — Apu M Mofiz
*Assistant Examiner* — Cindy Nguyen
(74) *Attorney, Agent, or Firm* — Wood IP LLC

(57) ABSTRACT

A portable, hand-held computer functions as an intermediary between a database server and individual aircraft when the aircraft cannot be connected to the database server. By virtue of being portable and being locally linked (over time) to different aircraft, the intermediary computing device can provide the data upload validation and auditing for accurate billing of database usage for a flight database provided from the server. This ensures that each aircraft which receives an uploaded database is entitled to receive the upload based on a paid license. As a result, billing by the database vendor is based on usage. Licensing and data authentication is mediated by the intermediary computing device.

16 Claims, 4 Drawing Sheets

Exemplary Aircraft

(56) References Cited

U.S. PATENT DOCUMENTS

| | | |
|---|---|---|
| 2012/0197693 A1 | 8/2012 | Karner |
| 2013/0041851 A1 | 2/2013 | Judkovics |
| 2018/0365265 A1 | 12/2018 | Blanc et al. |
| 2019/0103030 A1* | 4/2019 | Banga .................. G08G 5/0026 |
| 2021/0082293 A1* | 3/2021 | Geng ................... G08G 5/0069 |
| 2022/0051571 A1* | 2/2022 | Iyer ....................... H04L 9/3231 |

* cited by examiner

SECURE AUTHENTICATION FOR DISTRIBUTION OF AIRCRAFT FLIGHT DATA

TECHNICAL FIELD

The present invention relates to the fields of aviation, to digital data authentication, and to secure confirmation of distribution of digital data. The present invention further relates more specifically to control and distribution of secure, flight-related data to multiple individual aircraft.

BACKGROUND

A modern aircraft, in flight, requires a navigational database (NAVDB in this document, sometimes referred to as "NDB" in the art) to provide essential data regarding airports, airways ("highways in the sky"), airport approaches (the "on-and-off ramps" to airports), terrain database(s), airport physical infrastructure, runways, navigational aids, gates, standard instrument departures (SIDs), standard terminal arrival routes (STARs), and similar data. This data is essential for safe landings and take-offs, and assists in avoiding conflicts with other air other traffic and with ground obstacles.

The NAVDB must be updated on a regular basis, on what is known as an "AIRAC cycle" which occurs every 28 days. These updates provide revised information for runway closures, airport maintenance, airport communication frequencies, standard instrument approaches, VHF and NDB (non-direction beacon) navigational aids, and other changes in the ground-based, aircraft-support infrastructure. (This updating may be viewed as being similar to the way car and truck drivers will update the GPS systems for their cars, and further to the way GPS updates are likely to be essential for self-driving cars in the future. Essentially, airplanes need the latest airway and airport data, as well as the latest flight procedures and rules.)

In current worldwide practice, various states (whole nations or states within nations) have government or civil organizations which publish appropriate navigation data and update the data on a regular basis. The updated data is then obtained by, and consolidated by, a handful of organizations or private companies (for example, Jeppesen, Lufthansa Systems FlightNav Inc., and others). The consolidated data is then sold in industry-standard formats to other large third-party suppliers of aircraft systems and vendors of aircraft navigational data, such as for example General Electric Aviation (G.E. AV). (For example, the license server 320 of exemplary system 300 (as illustrated in FIG. 3 below), and which provides an updated NDVDB 330 at regular intervals, may be a license server maintained by a vendor such as General Electric, Inc.)

Typically, aircraft data vendors such as G.E. AV will process the NAVDB data to compile the data in a GE-proprietary form. Compiling the data may entail, for example and without limitation: sub-setting the data based on memory-size constraints or other factors, and data compression. The compiled NAVDB is then distributed to each airline which pays the vendor (such as GE Aviation Systems (GEAS)) for the NAVDB, which is typically licensed on a fee per-aircraft basis. The NAVDB vendor will therefore typically maintain a database or listing of specific aircraft which are authorized (by contract and with a paid license fee) to receive the NAVDB updates.

In legacy systems (that is, current distribution systems), aircraft are typically not connected to the internet during time on the ground or in maintenance. Therefore, aircraft maintenance personnel use entirely local data means, such as floppy disks or Ethernet loaders, to load an updated NAVDB onto airplanes. These are direct electrical connections to a flight management system (FMS). This can cause delays in data loading, and also fails to provide any means to audit data uploads, to ensure that only properly licensed airplanes (as identified by their "tail numbers") can obtain the data. Currently, financial billing for data updates is performed on an "honor system" basis.

In legacy systems, data users (the airlines) report their fleet size to data vendors (for example, G.E.) on a cyclic basis, and data vendors such as G.E. then charged accordingly. This is a very error-prone, coordination-heavy billing process, and with the potential for errors compounded by the lack of per-aircraft authentication of the database upload. In the worst cases, there may be sloppiness in reporting, and potentially even under-reporting of data uploads (whether by error or intent).

What is needed then, is a system and method for reliably updating an aircraft database, such as an aircraft navigation database, with the update process having suitable updating monitoring, tracking, and auditing; and all of this being done while the aircraft does not normally have a connection to a remote update server.

SUMMARY OF THE INVENTION

The present system and method addresses the above-noted deficiencies in the NAVDB upload, audit, and billing process.

In some embodiments, the present system and method employs a portable, hand-held computer, such as (for example and without limitation) an electronic flight bag (EFB), an iPad, or other tablet computer with an electronic flight bag app. The portable computing device functions as an intermediary between the database server and each aircraft. By virtue of being portable and being locally linked (over time) to different aircraft, the intermediary computing device can provide the data upload validation and auditing for accurate billing of database usage.

This ensures that each aircraft which receives an upload is entitled to receive the upload based on a paid license. As a result, billing by the database vendor is based on usage. If an FMS of a particular aircraft wants to use the NAVDB in a given cycle, it needs to authenticate against the database/license server with its tail number (or equivalent). The authentication is mediated by the intermediary computing device.

Persons skilled in the relevant arts may recognize that there are existing computing environments where computers and other similar digital computational devices maintain substantially routine, sustained communicative connection with and/or access to the internet. In such "sustained internet" environments, it is commonplace to validate/authenticate/unlock various computer software, databases, and other digital resources via a standing internet connection with a central server.

In the present context, however, such a sustained internet connection is not routinely present. Airplanes in flight, and avionics systems in general, while having radio connectivity with various ground and satellite resources, are not routinely connected to the internet. The present system and method therefore provides for database validation and activation without immediate, contemporaneous internet access, via the intermediary computing device.

BRIEF DESCRIPTION OF THE DRAWINGS

Advantageous designs of embodiment of the present invention result from independent and dependent claims, the description, and the drawings. In the following, various examples of embodiments of the invention are explained in detail with the aid of the attached drawings:

DETAILED DESCRIPTION OF EXEMPLARY EMBODIMENTS

The following detailed description is merely exemplary in nature and is not intended to limit the system and methods, nor the elements or steps of the system and method, nor its applications, and its uses disclosed herein. Further, there is no intention for the scope to be bound or limited to or by any theory presented in the preceding background or summary, nor in the following detailed description. The scope of the present system and method is set forth in the appended claims, as understood in light of the written description.

I. Terminology, Multiple Embodiments, and Scope

It will be understood in this document that:

Description of various embodiments may use "comprising" language, indicating that the system and method may include certain elements or steps which are described; but that the system and method may also include other elements or steps which are not described, or which may be described in conjunction with other embodiments, or which may be shown in the figures only, or those which are well known in the art as necessary to the function of processing systems. However, it will be understood by one of skill in the art that in some specific instances, an embodiment can alternatively be described using the language "consisting essentially of" or "consisting of."

II. Exemplary Aircraft and Processing System

Figure 1:
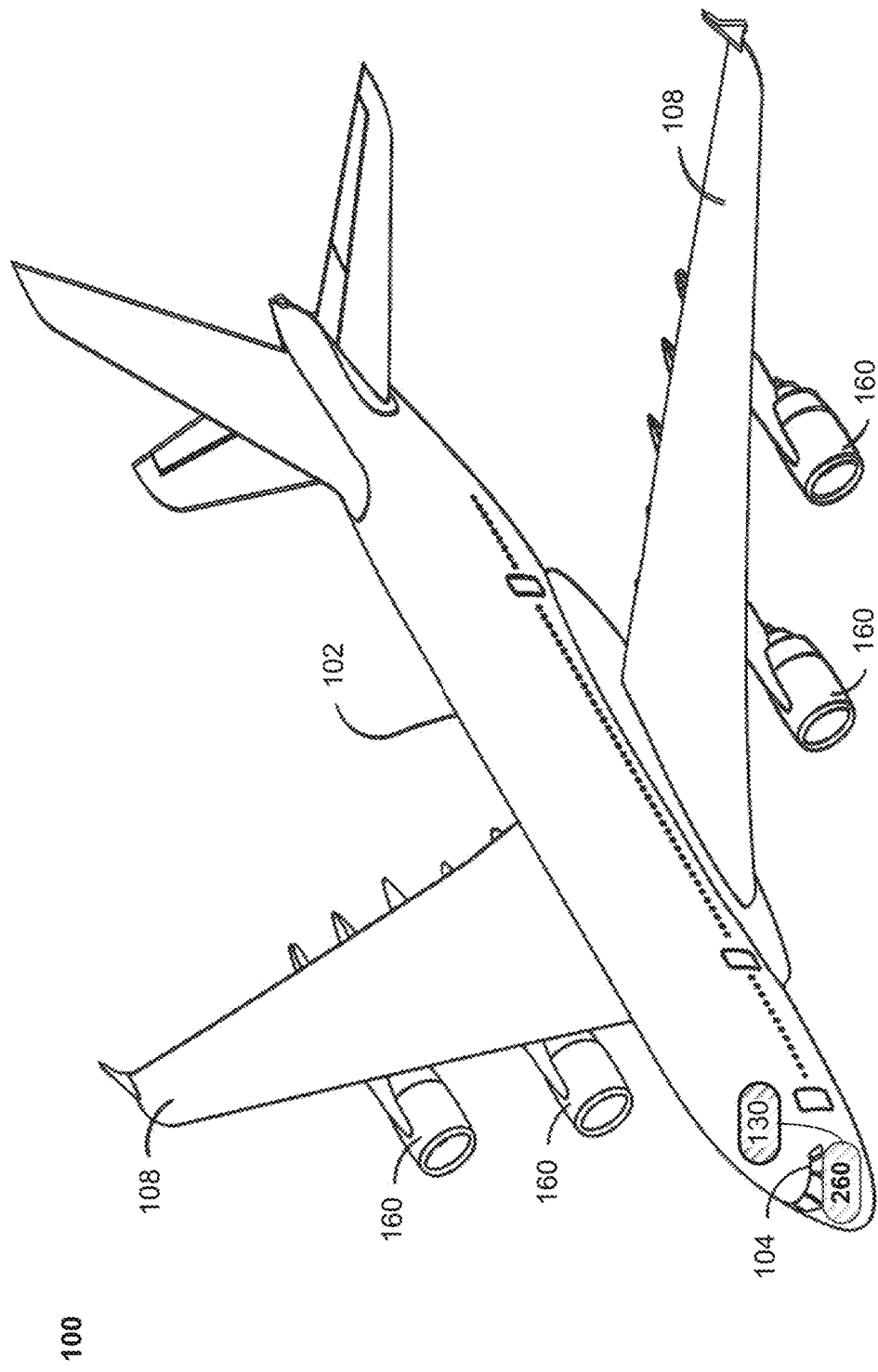
FIG. 1 illustrates an exemplary aircraft according to the present system and method.

FIG. 1 illustrates an exemplary flight transport vehicle 100, and more particularly an aircraft 100, according to the present system and method. The aircraft 100 may include a fuselage 102, a cockpit 104 positioned in the fuselage 102, and wing assemblies 108 extending outward from the fuselage 102. The aircraft 100 can also include multiple engines 160. While a commercial fixed wing aircraft 100 has been illustrated, it is contemplated that aspects of the disclosure described herein can be used in any type of fixed wing, rotary wing, or convertible wing aircraft 100 or other flight transport vehicles 100, including for example and without limitation: helicopters, re-launchable rockets, and drones.

Controllers and Avionics: The aircraft 100 may include one or more general aircraft controllers 130, together referred to as the avionics suite 130. The controllers and/or avionics suite may include a flight management computer system (FMCS) 130, discussed further below. Pilot controls and visual displays 260 are linked to the FMCS 130. The FMCS 130 may also interfaces with various aircraft control systems and sensors (not shown in FIG. 1) to obtain operational status of the aircraft 100.

Figure 2:
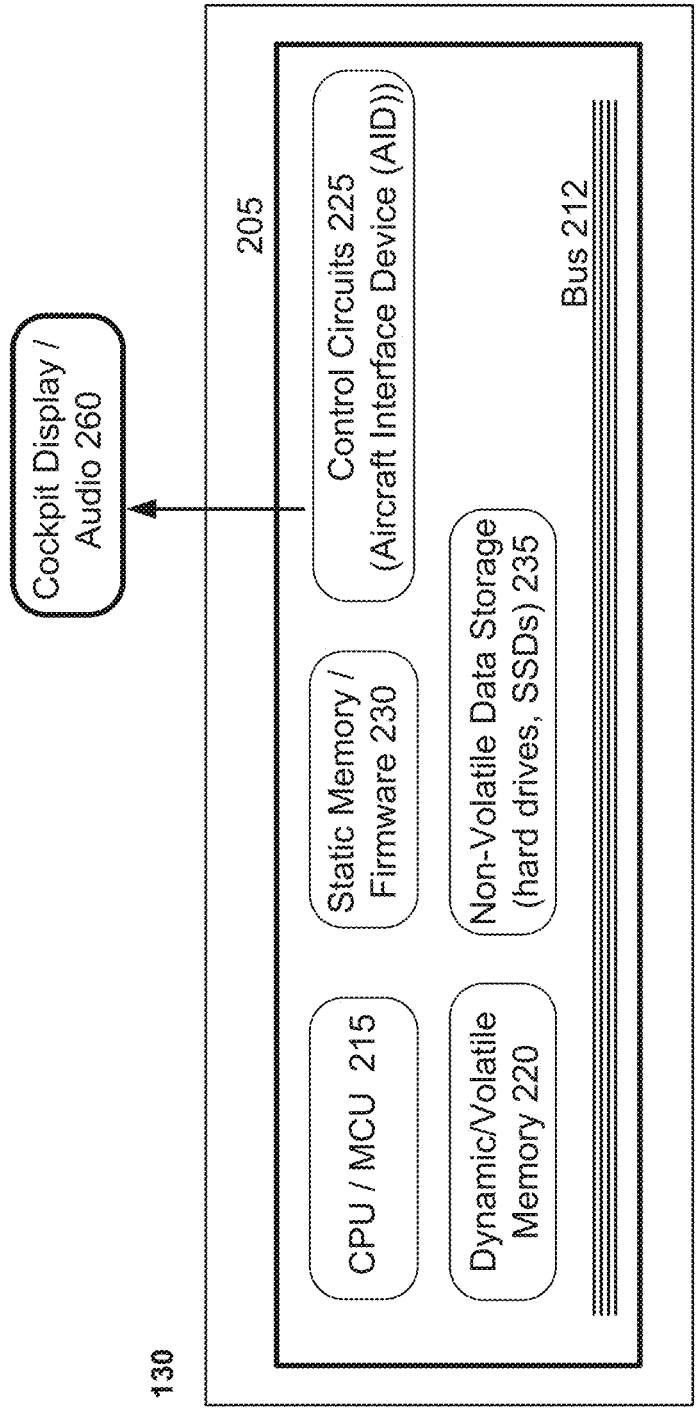
FIG. 2 presents a block diagram of an exemplary aircraft controller which may be employed according to the present system and method.

FIG. 2 presents a block diagram or system level diagram of an exemplary controller 130, such as a digital flight management computer system (FMCS) 130, which may be employed according to the present system and method. FMCS 130 may implement or execute, for example, computer code (software or firmware) which enables the aircraft to perform the data transfers, data storage, and/or data validation methods presented in this document. The computer code for specific functions may be referred to as modules 350, such as the update module 350 discussed further below (see FIG. 3).

Exemplary controller 130 typically has a motherboard 205 which typically holds and interconnects various microchips 215/225/230, and volatile and non-volatile memory or storage 220/235, which together enable at the hardware level the operations of the controller 130, the code modules 350, and in particular enable some of the operations of the present system and method. Controller 130 may include, for example and without limitation:

A hardware microprocessor 215, also known as a central processing unit (CPU) 215 or microcontroller (MCU) 215, which provides for overall operational control of the controller 130. This includes but is not limited to receiving data from data files or from connections to other computers, receiving data from a target hardware platform, and sending data or files to a target hardware platform. Microprocessor 215 is also configured to perform the arithmetic and logical operations necessary to implement the present system and method.

Static memory or firmware 230 may store non-volatile operational code, including but not limited to operating system code, computer code for locally processing and analyzing data, and computer code which may be used specifically to enable the controller 130 to implement the modules and methods described in this document and other methods within the scope of the appended claims. CPU 215 may employ the code stored in the static memory 230 and/or dynamic memory 220 and/or non-volatile data storage 235 to implement the methods and modules described in this document and other methods.

Control circuits 225 may perform a variety of tasks, including data and control exchanges, as well as input/output (I/O) tasks, network connection operations, control of the bus 212, and other tasks generally known in the art of processing systems. Control circuits 225 may also control or interface with non-volatile data storage 235, and interface with aircraft sensors.

Control circuits 225 may also support such functions as external input/output (I/O) (for example, via USB ports, an Ethernet port, or wireless communications, not illustrated in the figure). For example, control circuits 225 may include an aircraft interface device (AID) 225 for enabling the controller 130 and the aircraft 100 in general to interface with external and/or portable computing devices.

Volatile memory 220, such as dynamic RAM (DRAM), may be used to temporarily store data or program code, or code modules. Volatile memory 220 may also be used to temporarily store some or all of the code from static memory 230/235.

Non-volatile storage 235 may take the form of hard disk drives, solid state drives (including flash drives and memory cards), recording on magnetized tape, storage on DVD or similar optical disks, or other forms of non-volatile storage now known or to be developed. Either static memory 230 or non-volatile data 235 may be used for persistent storage of various flight-related databases 330, such as the navigational database (NAVDB or NDB) 330 discussed further below in this document (see FIG. 3).

A system bus 212 provides for data communications among the CPU 215, memory 220, 230, and non-volatile data storage 235. A cockpit informational system 260, which may be visual (a display screen or visual projection), audio, or both, may be integrated into or communicatively coupled with the controller 130, so as to present flight data to a captain or first officer of the aircraft. The flight data presented via the cockpit informational system 260 may include, among other elements, airport data and navigational data obtained from the NAVDB 330 and other stored databases.

Other computational systems: In various embodiments, the present system and method may entail the use of a flight management computer (FMC) 130 as described in the exemplary embodiment of FIG. 3. In various embodiments, the present system and method may employ additional or alternative computational systems 130, some of which may not be part of the aircraft 100. These alternative, additional, or complementary computers 130 may include, for example and without limitation, an electronic flight bag (EFB) 305.2, discussed below; a portable maintenance tablet computer 305.2 or maintenance pad 305.2, also discussed below; and/or a license server/database server 320 (discussed further below). Persons skilled in the relevant arts will appreciate that these other computer systems 305.1, 305.2, 320 may include many elements the same as or substantially similar to the aircraft controller 130 discussed above, including for example and without limitation: a CPU 215, memory 220, 230, 235, and control circuits 225.

III. Overview of Navigational Database Maintenance and Update Services

Figure 3:
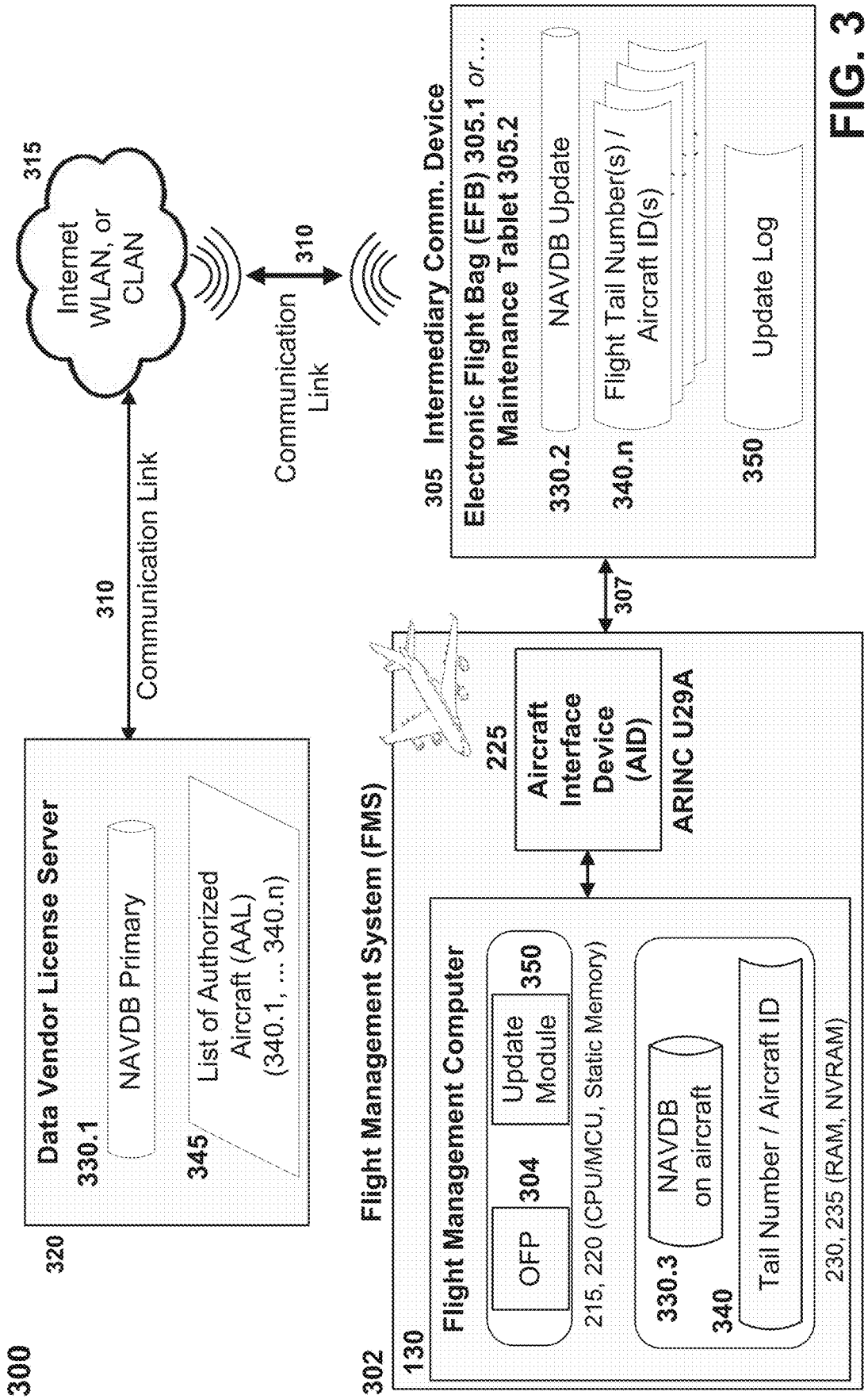
FIG. 3 presents aircraft database update system architecture.

With reference now to FIG. 3: Modern aircraft are equipped with a flight management system (FMS) 302. In some embodiments of the present system and method, the FMS 302 is implemented via the flight management computer 130 (FMC) discussed above, which executes one or more software programs or software modules, such as an Operational Flight Program (OFP) 304. (This document distinguishes between the FMC 130, which is computer hardware, and the FMS 302, which is the FMC 130 configured with suitable software programs or modules. Elsewhere in the art, the FMC 130 configured with FMS 302 may be referred to simply as the flight management computer systems (FMCS); "FMS 302" as used in this document may be considered essentially the same as FMCS as may be used elsewhere. It is also noted that elsewhere in the aviation industry, "FMS" may sometimes refer to "foreign military sales", but no such usage is intended here.)

An associated control and display unit 260 in the cockpit (discussed above), such as a Multi-Function Control Display Unit (MCDU) enables the flight crew to interact with the OPF 304.

Prior to a flight, the flight crew normally enters a flight plan (a planned aircraft route) into the FMS 302, so that the FMS 302 with appropriate flight plan will essentially fly the aircraft after takeoff until close to touchdown. This automated flying is done through the Autopilot (A/P) and Autothrottle (A/T), which may be elements of the OFP 304 (not illustrated in the figures) but are often instead elements of other line-replaceable units (LRUs); the A/P and A/T may navigate the aircraft along designated airways according to established procedures.

As one element of this automated navigation, the FMS 302 requires a Navigational Database (NAVDB) 330. ("NAVDB" (330) is employed in this document, but the acronym "NDB" is frequently also employed in the art.) The NAVDB 330 contains information on airports; runways for each airport; and departure and arrival procedures for each airport (which provide for what are essentially pre-defined "on-ramps" and "off-ramps" connecting airports with the airways). The source for the NAVDB 330 is an Aeronautical Information Publication (or AIP), a publication containing aeronautical information of a mostly persistent character (such as airport locations) which is essential to air navigation. AIPs are usually issued by or on behalf of the respective civil aviation administrations of various nations.

However, airports can change over time, as can aviation procedures. AIPs are therefore kept up-to-date by regular revisions on a fixed cycle. For operationally significant changes in information, the cycle known as the AIRAC (Aeronautical Information Regulation And Control) cycle is used: revisions are produced every 56 days (double AIRAC cycle) or every 28 days (single AIRAC cycle). In this document, for convenience and without limitation, an exemplary 28-day revision cycle is assumed.

As a result, an aircraft's NAVDB 330 typically needs to be updated every twenty-eight (28) days in order to maintain current information such as temporary runway closures, or other equipment shut down for things like maintenance. The availability of this data is essential for flightworthiness.

Information services are therefore required by the airlines to obtain the updated NAVDBs 330 and to process the updated NAVDB data on the 28-day cycles, with the flight management system (FMS) 302 of each individual aircraft 100 requiring an update to be stored in its persistent memory 230, 235. Typically, updated NAVDBs 330 are provided to the airlines by third-party informational services, with each airline being obligated to pay a per-aircraft fee for the updates.

Persons skilled in the relevant arts will be aware that individual aircraft 100 are identified by individual aircraft numbers (or tail numbers). Updated NAVDB s 330 are typically loaded into the FMS 302 of each aircraft by an aircraft maintenance crew, using tangible local (portable) data storage devices such as old-style floppy drives (which is used to help ensure data integrity and chain of custody, which is not as readily established by other data transfer means such as Bluetooth or USB connections).

As a result, in legacy aircraft, the FMS 302 itself or even the crew data device that is used to load the NAVDB 330 into the FMS 302 is typically not connected to the outside world. Consequently, there is no centralized verification or validation (via a validation code or similar) to ascertain that the particular FMS 302 of the particular aircraft 100, as identified by its aircraft number, is entitled to receive the updated NAVDB 330. Further, in legacy aircraft maintenance systems and operation, there is no validation that a correct NAVDB 330 (a most recent NAVDB from a validated source) is actually being uploaded into the FMS 302.

NAVDB and Aircraft Authentication via Intermediary Authentication Device

The present system and method is directed towards the adaptation of an Intermediary Authentication Device (IAD) 305, which may also be referred to as an Intermediary Upload Device 305, for the upload and authentication of NAVDB updates 330.2.

In some embodiments of the present system and method, the Intermediary Upload Device (IAD) 305 may be a digital processing device and/or digital computational device with a processing architecture which may be the same or similar to that of the exemplary flight management computer 130

(discussed above). However, in some embodiments of the present system and method, the IAD 305 may different from the flight management computer 130 at least in view of portability; while the flight management computer 130 is typically designed and configured to be integrated into the structure of the aircraft 100, in some embodiments the IAD 305 may be configured as a portable computing device such as a laptop, tablet computer, or possibly some other dedicated, hand-portable computing device 305.

In some embodiments of the present system and method, the IAD 305 may be an electronic flight bag (EFB) 305.1 for the authentication of NAVDB updates. An EFB 305.1 is a portable, general purpose computing system that helps flight crews perform multiple different flight management and/or in-flight maintenance tasks. Captains and/or first officers will typically bring an EFB 305.1 on board for each flight (with data which is customized for the airplane 100 and the particular flight).

In alternative embodiments of the present system and method, the IAD 305 may be a maintenance tablet (MT) 305.2 which is used for multiple purposes, including for the authentication of NAVDB updates. An MT 305.2 is in general a portable, general purpose computing system aircraft engineers and maintenance teams to perform ground-based aircraft maintenance between flights.

FIG. 3 presents a system-level diagram for an exemplary aircraft database update system (ADUS) 300 which in some embodiments is a distributed system. The ADUS 300 may be employed for any or all of updating an aircraft database, authorizing an aircraft database, validating an aircraft database, and auditing an aircraft database and/or the aircraft 100 itself to determine that the database 330 is authorized for use on or with the aircraft 100.

In-flight-database: In some embodiments of the present system and method, the flight-database to be updated, validated, authorized, and/or audited may be a NAVDB 330, as described elsewhere in this document. In alternative embodiments, other in-flight-databases 330, either mission-critical or non-mission critical, may be applicable. ("In-flight-database" and "flight-database" are used synonymously and interchangeably for databases which may be used and accessed during aircraft flight.")

Database and License Server: In some embodiments of the present system and method, the ADUS 300 may include a database server 320 and/or license server 320. The license server 320 may store an authorized aircraft list (AAL) 345 of aircraft 100 which are authorized to receive an update to the NAVDB 330.1. The AAL 345 may identify authorized aircraft by individual aircraft tail numbers or other aircraft IDs. The AAL 345 may include other information for auditing purposes, such as the dates of NAVDB updates, fees paid by various airlines for NAVDB updates, and other information pertinent for updating, authorizing, and/or auditing distribution and usage of the NAVDB 330.

In some embodiments of the present system and method, the license server 320 may also store a latest, source or original NAVDB 330.1 (identified in FIG. 3 as the NAVDB primary). In an alternative embodiment, the NAVDB primary 330.1 may be stored on a different server from the license server 320. For purposes of description and brevity only, this document assumes an exemplary system architecture where the NAVDB primary 330.1 and the list of authorized aircraft 345 are stored on a common or shared file server.

However, while a single data vendor license server 320 is illustrated in exemplary system 300, additional such servers may be involved. For example, the vendor may upload the data to separate license servers 320 (not shown in the figure) maintained by each separate airline. Ultimately, however, license servers according to the present system and method are configured, separately or via distributed software modules, to maintain records of authorized aircraft 100, and data transfer, update, licensing, and other pertinent auditing data pertaining to the distribution of digital copies of an updated NAVDB database 320 to specific airlines and specific airplanes 100. Thus, the single AAL 345 shown in FIG. 3 is exemplary only and should not be construed as limiting.

Internet, WAN, or LAN: The exemplary aircraft database update system (ADUS) 300 is construed to include or to utilize a generalized, wide-area data communications system 315 or data network system 315, such as the internet, a wide area network (WAN) or a local area network (LAN). Along with suitable communications links 310, which may be wired, wireless, or a combination of both, the generalized data network 315 enables data communications between the license server 320 and the intermediary authentication devices 305.

In one embodiment of the present system and method, the license server 320 may be a file server which is remote from the airport, such as a third-party government or corporate server 320. In alternative embodiments, the license server 320 may be a ground-based computer local to a particular airport.

Intermediary Communications Device (EFB or Maintenance Tablet): For purposes of database installation on an aircraft—which may include both an initial installation, and updates—an intermediary communications device (ICD) 305 may be employed. The intermediary communications device may be, for example and without limitation, an electronic flight bag (EFB) 305.1 or a maintenance tablet 305.2, as discussed in more detail above. The ICD 305 may be communicatively coupled with the license server 320 via one or more communications links 310 which may be wired, fiber optic, or wireless (including for example via satellite); and such communication may occur in whole or in part through a local or wide-area network 315 or an extended cloud network such as the internet 315. An aircraft captain first officer, or maintenance technician, may use the ICD 305 to obtain from the license server 320 the primary NAVDB 330.1; the ICD 305 then stores a copy of the NAVDB 330 in its local persistent storage 230, 235 as a most recently updated NAVDB 330.2.

The ICD 305 may store a list of one or more aircraft IDs 340" indicative of the aircraft which are authorized to receive the NAVDB updates 330.2. The ICD 305 may also store a log (a list or other database) indicative of which aircraft 100 have actually received updated NAVDB's, either during a current round of updates and/or in the past. In various embodiments, the list of flight tail numbers/aircraft ID's 340" and the update log 350 may be part of a single common database file or structure stored on the ICD 305, or each may have separate storage on the ICD 305.

Flight Management System: Subsequent to obtaining the updated NAVDB 330, the captain or technician may connect the intermediate communications device 305 (either the EFB 305.1 or maintenance tablet 305.2, as appropriate) with the flight management system (FMS) 302. In an embodiment of the present system and method, the connection is made directly and locally, via a wired or wireless connection, and may be made via the aircraft interface device 225 which communicatively couples the ICD 305 with the FMS 302. In an embodiment of the present system and method, an update module 350 of the FMS 302 may obtain the updated NAVDB 330.2 and store a copy of the NAVDB 330.2 in persistent storage on the aircraft 100. The update module 305 may also communicate and exchange data with the intermediate communications device 305 for purposes of database validation, authentication, and/or auditing.

In an alternative embodiment, the ICD 305 may load the NAVDB 330.2 into an onboard maintenance system (OMS) (not shown in the figures) of the aircraft 100. The OMS then distributes the NAVDB 330.2 to the FMS 302.

Exemplary Functions of the Intermediary Communications Device: In one embodiment of the present system and method, the exemplary ADUS architecture 300 enables a portable, hand-carried, intermediary communications device 305 (such as an EFB 305.1 or maintenance tablet 305.2) to connect with the aircraft's FMS 302 while maintaining live connectivity to the license server 320.

In an alternative embodiment of the present system and method, the ICD 305 may connect with the FMS 302 while not being concurrently connected with the internet 315 or license server 320. In such embodiments, the ICD 305 may connect with the license server 320 at other times (later or earlier) to authenticate an NAVDB 330 as valid, and to authenticate the upload of the NAVDB 330 to any particular aircraft 100.

In some embodiments of the present system and method, other flight-related databases 330 may be uploaded in addition to, or in alternative to, the NAVDB 330.

In some embodiments of the present system and method, the NAVDB 330 may be initially locked, meaning the NAVDB 330 is encrypted and cannot be read until unlocked. Under the present system and method, the NAVDB 330 is unlocked for use on a given aircraft by the ICD 305, but only after the ICD 305 has authenticated either or both of the NAVDB 330 and the aircraft 100 in which the NAVDB 330 is uploaded.

In one embodiment of the present system and method, the ICD 305 unlocks the NAVDB 300 (for example, by decrypting it, or by storing a decryption key on the FMS 302 of the aircraft 100) only after: (i) uploading the NAVDB 330 to the FMS 302, and after (ii) validating that the particular aircraft 100 is entitled to the upload (meaning, the airline has paid for the upload of the NAVDB 330 to the particular aircraft 100). The validation is performed based on the tail/aircraft number 340 of the aircraft 100, as matched against authorized aircraft/tail numbers 345 obtained, by the ICD 305 from the license server 320.

Exemplary Method of Database Update and Update Auditing

Figure 4:
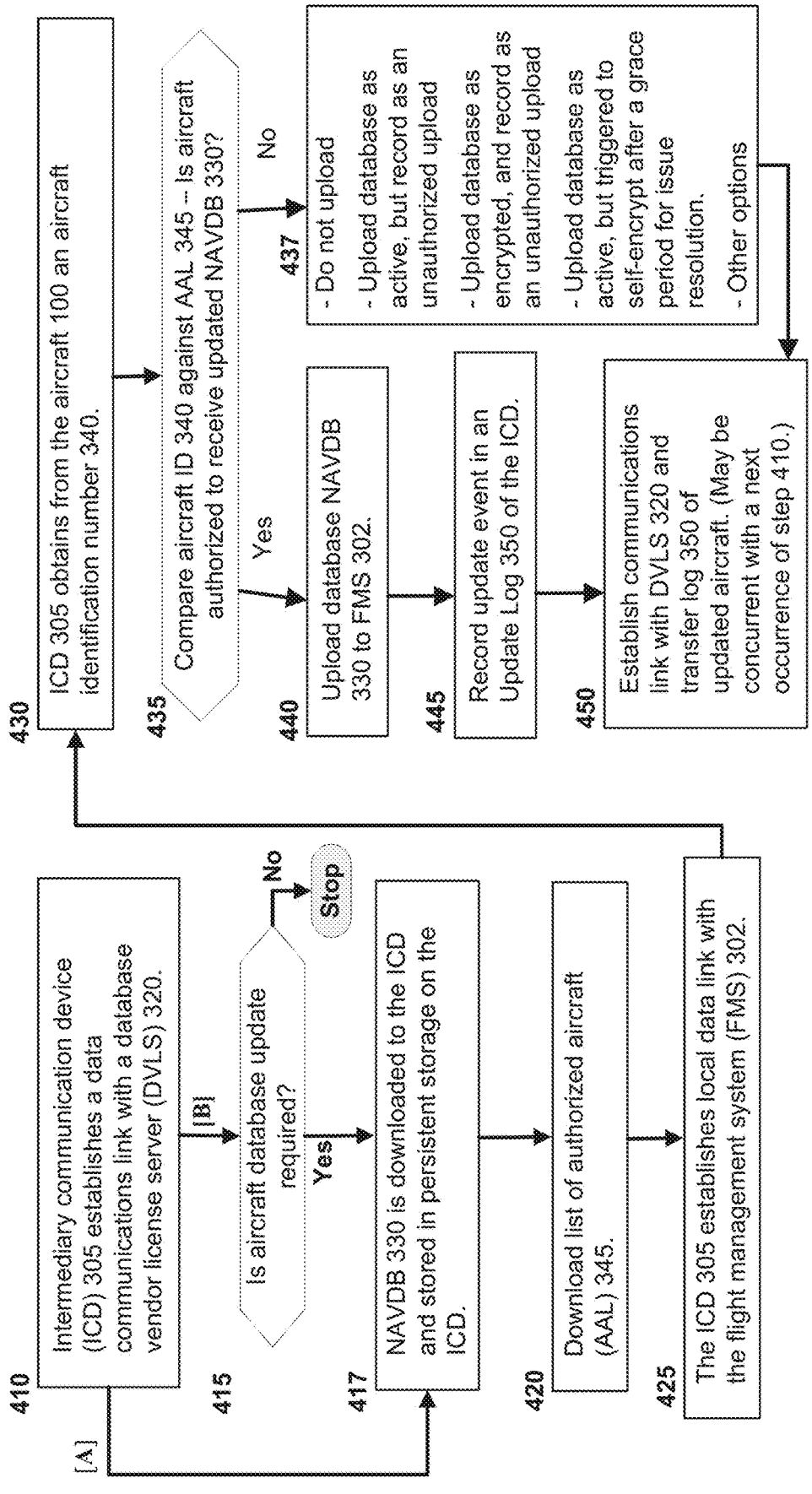
FIG. 4 presents a flow chart of an exemplary method for updating a database over a distributed system architecture.

FIG. 4 presents a flow chart of an exemplary method 400 for updating a navigational database on an aircraft 100 via a distributed system architecture 300. The method may be performed, for example, by an intermediary communication device 305 already described elsewhere in this document.

ICD Connects with Server: The method 400 begins with step 410. In step 410 intermediary communication device 305, while still independent of any specific aircraft, establishes a data communications link with a database server and/or license server 320 such as exemplary data vendor license server 320. As part of this step, the ICD 305 may establish a secure communication, including an appropriate secure login with the license server, according to security, password, biometric, and other validation procedures known in the art.

Following step 410, and in one embodiment [A] of the present system and method, the ICD 305 may automatically download the aircraft database 330.1, in which case the method proceeds directly to step 425. For example, aircraft database updates may be scheduled for certain dates according to the AIRAC cycle.

Assess if update is required: However, an alternative embodiment [B] of the present system and method may employ an optional step 415. In optional step 415, the ICD 305 may determine if it requires an update of an aircraft database 330. Determination may entail, for example, identifying whether the current date is the date on which an update is supposed to occur. In an embodiment, the ICD 305 may identify a current version or current date of an aircraft database 330.2, which is already stored in its persistent storage 230, 235, and compare that with a version or release date of the aircraft database 330.1 as stored on the license server 320. If the license server 320 stores an aircraft database 330.1 which is more recent, or of a later version than the aircraft database 330.2 on the ICD 305, then the ICD 305 determines that the database needs to be updated. In an alternative embodiment, it may be the license server 320 which communicates with the ICD 330 and determines if its version of the aircraft database 330.1 is a more recent version than the version on the ICD 305. If in step 415 it is determined that the aircraft database 330 should be updated, the method proceeds to step 420.

Upload Navigational Database to ICD: In step 417, the most recent navigational database 330.1 is uploaded to the ICD 305 from the server 320, where the ICD 305 then stores a copy of the database 330 in persistent storage as the navigational database 330.2. The method proceeds to step 420.

List of authorized aircraft: In step 420, the ICD 305 downloads from the license server 320 the list of authorized aircraft, or authorized aircraft list (AAL) 345. The AAL 345 may contain a list of aircraft which are authorized to receive the updated aircraft database 330, for example with the aircraft identified by tail numbers, or other aircraft IDs.

Manual disconnection/transport of ICD: Following step 420, there may be a time delay or hiatus, possibly extending minutes or hours, or in some embodiments, even days, between the performance by the ICD 305 of step 420 and the performance by the ICD of step 422. During this hiatus, the user of the ICD 305 (who may be an aircraft captain or first officer, or aircraft maintenance person) may optionally disconnect the intermediary communication device 305 from the internet 315 and/or data license server 320; and will typically transport the ICD 305 to an aircraft 100 (via hand-carriage or on-person carriage). (This procedure is not included in the flowchart of method 400 in FIG. 4.)

ICD coupled with aircraft: At the aircraft, and in step 425, the aircraft captain or aircraft maintenance person establishes a physical and communicative coupling between the ICD 305 and the flight management system 302 of an aircraft 100. This physical coupling may entail connecting the ICD 305 to the flight management computer 130 via connections known in the art (such as wireless connections, which may entail Wi-Fi or Bluetooth; or via a wired link such as USB, Ethernet, or fiber optic link; or via an expansion of the ACARS network). In some embodiments, the physical layer linkage may be mediated by aircraft interface device 225. Also in step 425, the ICD 305 and the flight management systems 302 establish signaling, logical, and data links (for example, data, session, transport, and application layer communications links) which may entail various validation and authorization procedures according to methods well known in the art.

Obtain aircraft ID number: In step 430, the ICD obtains from the flight management system 302 or from a communications management unit (CMU) of the aircraft 100 an aircraft identification number 340. The aircraft identification number 340 may be a tail number or aircraft ID, or other designated aircraft identification. In one embodiment of the present system and method, the aircraft identification number 340 may be stored in the persistent storage of the flight management systems 302. In an alternative embodiment, the aircraft designation/ID 340 may be obtained manually by an aircraft captain or first officer, or aircraft maintenance personnel (for example, from an aircraft number painted on the exterior of the aircraft itself; or from a plaque in the cockpit with this information); further, the aircraft ID 340 may be manually entered into the ICD 340 (via keyboard, touchscreen interface, voice commands, or similar). The method proceeds with step 435.

Validation of aircraft to receive updated data: In step 435, and in one embodiment of the present system and method, the ICD 305 compares the aircraft identification number 340 for the aircraft 100 against the authorized aircraft list (AAL) 345. The ICD 305 determines if the aircraft 100 is authorized to receive the updated aircraft database 330.2.

In an alternative embodiment of the present system and method, the validation of the aircraft 435 is performed manually, by the aircraft captain, first officer, or maintenance person. The aircraft captain/maintenance person compares the aircraft ID against a list of authorized aircraft (which may be stored on the ICD 305, or alternatively on another portable computing device, or even on a printed, hand-carried list). If the current aircraft 100 is manually confirmed by the aircraft captain/maintenance person, the same individual may initiate the upload of step 440 (immediately below).

Database upload: If in step 435 it is determined that the aircraft 100 is authorized to receive the updated database 330.2, then in step 440 the ICD 305 uploads the updated database 330.2 for storage by the flight management system 302. A copy 330.3 of the most recent database 330.1 is thereby stored in the flight management system 302. The upload step 440 may also entail various data validations and integrity checks to ensure that the database was updated correctly. Step 440 then continues with step 445.

In step 445, the ICD 305 records the update event in a stored internal update log 350, update record 350, or update database 350 to identify that the aircraft's navigational database 330 was updated for the specific aircraft 100 identified by the tail number 340.

Step 445 may they continue with step 450.

Step 450 may occur immediately after step 445. In an alternative embodiment step 450 may occur at sometime significantly later than step 445, at a time when the ICD 305 is no longer connected with or communicated coupled with the flight management systems 302 (and possibly no longer even physically proximate to the airplane 100). In some embodiments of the present system and method, step 450 may occur only after multiple different aircraft 100 have received updates of the NAVDB 330.

In step 450, the ICD 305 establishes a communications link with the license server 320, and then sends a message to the license server 320 or uploads the data file, indicative that the aircraft database 330 was updated for the particular aircraft 100

Non-authorized aircraft: Returning to method step 435, if it is determined that the aircraft tail number 340 does not match any tail number 340.*n* of the AAL list 345, the method proceeds with 437. Step 437 may vary in different embodiments may according to various policy choices of the database vendor:

(i) In one embodiment, the intermediate communication device ICD 305 does not update the database 330 on the flight management system 302.

(ii) In an alternative embodiment, the ICD 305 may proceed to upload to the aircraft 100 the updated database 330; but the ICD 305 may record in the update log 350 that an unauthorized airplane has been updated with the database 330. In such an embodiment, the updated database 330 is provided for reasons of flight safety, so that the aircraft does have the latest database 330; but at the same time the license server 320 (and via the license server, the database vendor) is notified that an unauthorized aircraft is received updated data 330.

(iii) Encrypted upload: In another alternative embodiment, the ICD 305 may proceed to upload to the aircraft 100 an encrypted version of the updated database 330. In this way, the aircraft now has a copy of the updated database 330; but the controlling airline may first need to resolve payment or license matters with the database vendor before receiving (from the vendor) a decryption key.

(iv) In an alternative embodiment, the method may employ various algorithms or parameters to determine if an unauthorized aircraft 100 should receive the updated database 330. For example, the method may determine that the aircraft 100 itself is of a different type (different design or category of aircraft) from the other aircraft 100 which have been updated, in which case, the method may indicate to not update the database 330. (It is possible, for example, that an aircraft technician was attempting to provide an updated database 330 to an aircraft 100 meant to receive an entirely different version of the database. It is also possible that a maintenance technician received from the airline a list of planes for maintenance, and the list erroneously identifies some aircraft as targets for updates.)

Alternatively, the method may determine that the aircraft is of a very different type than other aircraft which have received updates, suggesting for example, that the aircraft was erroneously identified by the airline as requiring an update, when in fact the aircraft either does not need an update or needs some other alternative database of different scope. In the latter case it may be determined that the database is not to be updated.

(v) In an alternative or complementary embodiment, if the ICD 305 determines that an aircraft is not authorized to receive the database update (330), the ICD may take at least two actions: (1) upload the updated NAVDB 330 to the FMS 302; and (ii) communicate via the cloud 315 with a financial or banking system to place a financial charge to a reserve fund or reserve financial account of the airline which owns the airplane 100. The financial charge is intended to cover the cost of the upload. (The airline would typically have the option to review and possibly challenge the charge at a later date, as arranged under a general license agreement with the database vendor.)

In general, there are embodiments of the present system and method where the NAVDB 330 will always be loaded to the FMS 302, but the NAVDB 330 may be locked until it is authorized. That way the NAVDB 302 is essentially "on deck", just requiring a quick license check. The detailed steps of such "on deck" approaches may vary in different embodiments.

Personal skills and relevant arts persons skilled in the relevant arts will appreciate that various additional steps may be taken, or alternative steps employed, and that the steps listed here are exemplary only. For example, in addition to uploading the updated NAVDB 330, the ICD 305 may be employed to upload and/or download other data to or from the aircraft 100, or to perform other status or communications checks pertinent to the aircraft 100.

Repeated, successive updates due to (A) multiple aircraft and/or (B) the AIRIC cycle. Persons skilled in the relevant arts will appreciate the following points:

(A) Steps 425 through 445 may be repeated, and indeed are likely to be repeated, multiple times, once per each aircraft, which requires an update of the aircraft database 330. Thus, the method described here may engage in a single update or download of the aircraft database 330 from the license server 320, as per steps 410 to 420; and then engage in multiple rounds of steps whatever through step 445, to obtain update multiple aircraft 100. At the conclusion of this process step 450 may be performed to identify to the license server 320 that the multiple aircraft 100 have been updated. In this way the license server 320 obtains the necessary information to identify specifically, which aircraft 100 have received updated databases 330, enabling proper auditing and billing of the services.

(B) There may be a substantial delay time—possibly days or even weeks—between step 440/445 (and/or step s 437), which entail the database upload from the ICD 305 to the FMS 302; and step 450, which transfers the update log from the ICD 305 to the remote server 320. The method only concludes with the performance of step 450. At the conclusion of a first performance of the entire method 400, step 450 may therefore occur simultaneously with initiation of a second performance of the method (starting at step 410) at the same time.

That is, when the ICD 305 again communicates with the license server to obtain another database update as per step 410 discussed above, step 450 of a previous round of updates may be performed concurrently over the same data connection. Restated again: When the method 400 engages in step 410 to obtain a list of authorized aircraft 345 and updated database 330.1, the method may also simultaneously perform step 450 so as to provide to the license server 320 confirmation and validation data for a prior round of updates.

Post-Upload Verification/Validation

In some embodiments of the present system and method, as described already above in this document, the ICD 305 may obtain an authorized aircraft list (AAL) 345 from the license server 320; and the ICD 305 verify (or attempt to verify) that an aircraft 100 is eligible for the uploaded database 330 while the IDC 305 is locally, communicatively coupled with the flight management system (FMS) 302.

In alternative embodiment, the ICD 305 may not have local storage for a list of authorized aircraft 345. Instead, the ICD 305 may be carried to and connected to the airplane 100 by a aircraft captain (using an EFT 305.1) who simply uploads the NAVDB 330 from the ICD 305 to the FMS 302; or the ICD 305 may be a maintenance tablet 305.2 carried by a maintenance staff person to multiple airplanes 100, for example according to a listing provided by the airline. In the latter case, the maintenance staff person again simply connects the ICD 305 to the FMS 302, and uploads the updated NAVDB 330 without any validation involved. (Such embodiments skip the method steps 417 and 435 of exemplary method 400, above.)

However, in such embodiments, the ICD 305 still obtains from the aircraft 100 the aircraft identification number 340 (as per step 430 of exemplary method 400). At some later time (and as per step 450), the ICD 305 still connects with the data vendor license server (DVL server) 320, and uploads to the DVL server 320 a transfer log 350 or transfer record 350, indicative of the upload of the revised NAVDB 330 to the aircraft. The DVL server 320, or associated servers and business systems, may then determine if the revised NAVDB 330 was uploaded to one or more unauthorized aircraft 100. Upon such a determination, appropriate processing and business procedures are initiated by the DVL server (or associated business/financial systems) to reconcile financial and/or licensing disparities between the airline and the aircraft vendor.

Database Encryption (Locking)

Reference as already been made above to data encryption. For purposes of the present document, encrypting the NAVDB 330 is effectively equivalent to "locking" the database, so that while it may be stored on the FMS 302 it cannot be accessed. As already discussed above, in some embodiments the copy of the NAVDB update 330.2 stored on the ICD 305 may be encrypted. Encryption may serve to protect the database 330 from digital theft (due to hacking, or due to deliberate improper distribution to personnel with access to the ICD 305). The encryption may be removed from the database 330.3 as copied to the FMS 302 during, or subsequent to, transfer of the NAVDB update 330 to the FMS 302.

In an embodiment already discussed above, if an aircraft 100 is not authorized to receive the update, the ICD 305 may still proceed to upload the revised NAVDB 330 to the aircraft 100; but with the NAVDB 300.3 having a built-in or associated software element to self-encrypt or otherwise block access to the database 330 (again, locking the database 330) after a designated grace period. In this case, delayed authentication or database validation, and/or encryption/decryption, could be performed by a standing encryption/decryption application on the FMS 302 or the Aircraft Interface Device 225 of the aircraft, so the presence of the ICD 305 is not required for delayed validation.

In various embodiments, different types and levels of authentication schemes, and encryption/decryption schemes, may be employed according to methods generally known in the art. For example, in addition to the tail number/aircraft ID 340 (which is generally publicly known or available), each airplane 100 may have its own unique, private airplane identification and/or airplane password.

Asymmetric encryption methods may be employed, with the aircraft 100 and the ICD 305 each storing either the public keys or private keys (according to details of the encryption approach employed). This ensures that the signing process is tamperproof from the airline, while still allowing local or private authentication without access to the Internet. Local validation may also be facilitated by a local, virtual network (VNET) which locally links multiple ICDs 305 (EFBs 305.1 and/or maintenance tablets 305.2). (The VNET is not illustrated in the figures.) In such deployments, in an aviation context, the aircraft AID 225 serves as gateway to the ICDs 305 and/or VNET. The ICD(s) may store cached versions of the 'B' keys (obtained initially from the database vendor license server 320), while each airplane 100 may store its own 'A' key on the AID 225 or other processing system.

FURTHER EMBODIMENTS

While the present system and method has been disclosed herein in the context of a navigational database (NAVDB) 330, the same methods may be applied to other aircraft databases 330 which may contain data or otherwise be pertinent to, or under some degree of authorization or control, of third-party resources or organizations. For example, various performance databases, such as those pertaining to aircraft drag, thrust, or fuel flow, may be uploaded and/or downloaded via the methods described herein, without requiring a direct internet connection.

The present system and method, then, can be used to more generally track which database(s) go on which aircraft. FMS-installed software applications and/or databases 330 may be controlled via various option codes which are updated via the ICDs 305 according to methods disclosed here, ensuring that airplanes employ on features or data for which they are licensed.

CONCLUSION

The present disclosure is directed towards systems and methods to employ a an ICD 305 to ensure that the correct and licensed third-party data 330 from remote servers 320 is routed to the correct airplanes, via cross-checking with the cloud-accessed servers, even though the airplanes 100 may not be connected with the cloud/internet 315 at the time of data downloads or uploads. The systems and methods of the present disclosure equally provide for convenient, reliable auditing/billing of data distribution to multiple aircraft.

Presented herein above, in various embodiments, are exemplary systems and methods directed towards achieving these objectives. Elements of different embodiments may be combined in various embodiments not specifically enumerated herein, and in some cases some elements may be omitted, within the scope of the appended claims. Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

What is claimed is:

1. A method, comprising:
   receiving at a hand-portable intermediary communications device (ICD), from a remote database server, a flight-database to be stored in a non-volatile storage of the ICD;
   establishing a local encrypted physical communicative coupling between the ICD and a flight transport vehicle;
   obtaining at the ICD from a flight management system (FMS) of the flight transport vehicle an identification number for the flight transport vehicle;
   wherein when the flight transport vehicle is not communicatively coupled with the remote database server, the ICD is configured to: (i) upload the flight-database for storage in the FMS, and (ii) support a determination according to the identification number when the flight transport vehicle is authorized to receive the upload of the flight-database; and
   determining, by the ICD, that when the flight transport vehicle is not authorized to receive the upload, the method further comprises:
   (i) storing in the FMS an unlocked version of the flight-database;
   (ii) recording in an update log of the ICD an indication that the aircraft associated with the identification number was not authorized to receive the update; and
   (iii) recording in the update log of the ICD an indication that the aircraft received the unlocked version of the update.

2. The method of claim 1, further comprising:
   upon determining that the flight transport vehicle is authorized to receive the upload, uploading from the ICD to the FMS the flight-database.

3. The method of claim 2, further comprising:
   recording in an update log of the ICD an indication that the aircraft associated with the identification number received the upload.

4. The method of claim 3, further comprising:
   uploading, from the ICD to the remote database server, the indication that the aircraft associated with the identification number received the upload.

5. The method of claim 1, further comprising:
   storing in the non-volatile storage of the ICD a locked version of the flight-database.

6. The method of claim 5, further comprising:
   upon a determination by the ICD that the flight transport vehicle is authorized to receive the upload, storing in the FMS the unlocked version of the flight-database.

7. The method of claim 1, further comprising:
   configuring the FMS via the ICD to lock an unauthorized flight-database after a designated grace period of time has expired.

8. The method of claim 5, further comprising:
   upon a determination by the ICD that the flight transport vehicle is not authorized to receive the upload, storing in the FMS the locked version of the flight-database.

9. A computer-readable, non-transitory storage medium storing instructions that, when executed by a hardware processor of an intermediary communications device (ICD) causes the ICD to execute a method comprising:
   receiving, from a remote database server, a flight-database to be stored in a non-volatile storage of the ICD;
   establishing a local encrypted physical communicative coupling between the ICD and a flight transport vehicle;
   obtaining at the ICD from a flight management system (FMS) of the flight transport vehicle an identification number for the flight transport vehicle;
   wherein when the flight transport vehicle is not communicatively coupled with the remote database server, the ICD is configured for: (1) uploading the flight-database to the FMS, and (ii) supporting a determination according to the identification number when the flight transport vehicle is authorized to receive the upload of the flight-database; and
   determining, by the ICD, that when the flight transport vehicle is not authorized to receive the upload:
   (i) storing in the FMS an unlocked version of the flight-database;
   (ii) recording in an update log of the ICD an indication that the aircraft associated with the identification number was not authorized to receive the update; and
   (iii) recording in the update log of the ICD an indication that the aircraft received the unlocked version of the update.

10. The computer-readable, non-transitory storage medium of claim 8, wherein the method further comprises:
    upon determining that the flight transport vehicle is authorized to receive the upload, uploading from the ICD to the FMS the flight-database.

11. The computer-readable, non-transitory storage medium of claim 10, wherein the method further comprises:
   recording in an update log of the ICD an indication that the aircraft associated with the identification number received the upload; and
   uploading, from the ICD to the remote database server, the indication that the aircraft associated with the identification number received the upload.

12. The computer-readable, non-transitory storage medium of claim 9, wherein the method further comprises storing in the non-volatile storage of the ICD a locked version of the flight-database.

13. The computer-readable, non-transitory storage medium of claim 12, wherein the method further comprises:
   upon the determination by the ICD that the flight transport vehicle is authorized to receive the upload, storing in the FMS the unlocked version of the flight-database.

14. The computer-readable, non-transitory storage medium of claim 9, further comprising:
   configuring the FMS via the ICD to lock an unauthorized flight-database after a designated grace period of time has expired.

15. The computer-readable, non-transitory storage medium of claim 9, further comprising:
   upon a determination by the ICD that the flight transport vehicle is not authorized to receive the upload, storing in the FMS the locked version of the flight-database.

16. A hand-portable intermediary communications device (ICD) comprising a hardware processor, control circuits configured for digital communications with other processing devices, and a memory, wherein the memory stores instructions which configure the processor to:
   receive, from a remote database server, a flight-database to be stored in a non-volatile storage of the ICD;
   establish a local encrypted physical communicative coupling between the ICD and a flight transport vehicle;
   obtain at the ICD from a flight management system (FMS) of the flight transport vehicle an identification number for the flight transport vehicle; wherein when the flight transport vehicle is not communicatively coupled with the remote database server, the ICD is configured for: (i) uploading the flight-database to the FMS, and (ii) supporting a determination according to the identification number when the flight transport vehicle is authorized to receive the upload of the flight-database; and
   determine, by the ICD, that when the flight transport vehicle is not authorized to receive the upload:
      (i) store in the FMS an unlocked version of the flight-database;
      (ii) record in an update log of the ICD an indication that the aircraft associated with the identification number was not authorized to receive the update; and
      (iii) record in the update log of the ICD an indication that the aircraft received the unlocked version of the update.

\* \* \* \* \*